United States Patent [19]

Starch

[11] Patent Number: 4,978,471

[45] Date of Patent: Dec. 18, 1990

[54] DISPERSIBLE SILICONE WASH AND RINSE CYCLE ANTIFOAM FORMULATIONS

[75] Inventor: Michael S. Starch, Midland, Mich.

[73] Assignee: Dow Corning Corporation, Midland, Mich.

[21] Appl. No.: 390,150

[22] Filed: Aug. 7, 1989

Related U.S. Application Data

[63] Continuation-in-part of Ser. No. 228,079, Aug. 4, 1988.

[51] Int. Cl.$^5$ .............................................. B01D 19/04
[52] U.S. Cl. ......................... 252/174.15; 252/174.21; 252/174.22; 252/321; 252/358
[58] Field of Search .................. 252/321, 358, 174.15, 252/174.21, 174.22

[56] References Cited

U.S. PATENT DOCUMENTS

| | | | |
|---|---|---|---|
| 3,784,479 | 1/1974 | Keil | 252/358 |
| 4,075,118 | 2/1978 | Gault et al. | 252/135 |
| 4,318,818 | 3/1982 | Letton et al. | 252/174 |
| 4,400,288 | 8/1983 | Dhanani et al. | 252/135 |
| 4,507,219 | 3/1985 | Hughes | 252/118 |
| 4,515,705 | 5/1985 | Moeddel | 252/174 |
| 4,563,347 | 1/1986 | Starch | 424/70 |
| 4,597,898 | 7/1986 | Vandermeer | 252/529 |
| 4,639,489 | 1/1987 | Aizawa et al. | 524/588 |
| 4,732,694 | 3/1988 | Gowland et al. | 252/174 |
| 4,749,740 | 6/1988 | Aizawa et al. | 524/588 |
| 4,798,679 | 1/1989 | Castro | 252/174.15 |

FOREIGN PATENT DOCUMENTS

| | | |
|---|---|---|
| 0091802 | 10/1983 | European Pat. Off. . |
| 2832679 | 2/1979 | Fed. Rep. of Germany . |
| 2285453 | 4/1976 | France . |
| 59-069110 | 4/1984 | Japan . |

Primary Examiner—John F. Niebling
Assistant Examiner—Isabelle R. McAndrews
Attorney, Agent, or Firm—Jim L. DeCesare

[57] ABSTRACT

A dispersible silicone antifoam composition for providing controlled foaming laundry detergent formulations effective in both the wash and the rinse cycles of a washing machine. The antifoam includes a non-aqueous emulsion of primary and secondary silicone antifoam agents, at least one nonionic silicone surfactant for emulsifying the primary and secondary antifoam agents in a solvent, a first organic surfactant dispersing agent for assisting in dispersing the emulsified primary and secondary antifoam agents in the laundry detergent, and a second dispersing agent of a nonionic difunctional block-copolymer terminating in primary hydroxyl groups for further assisting in dispersing the emulsified primary and secondary antifoam agents in the laundry detergent.

14 Claims, 1 Drawing Sheet

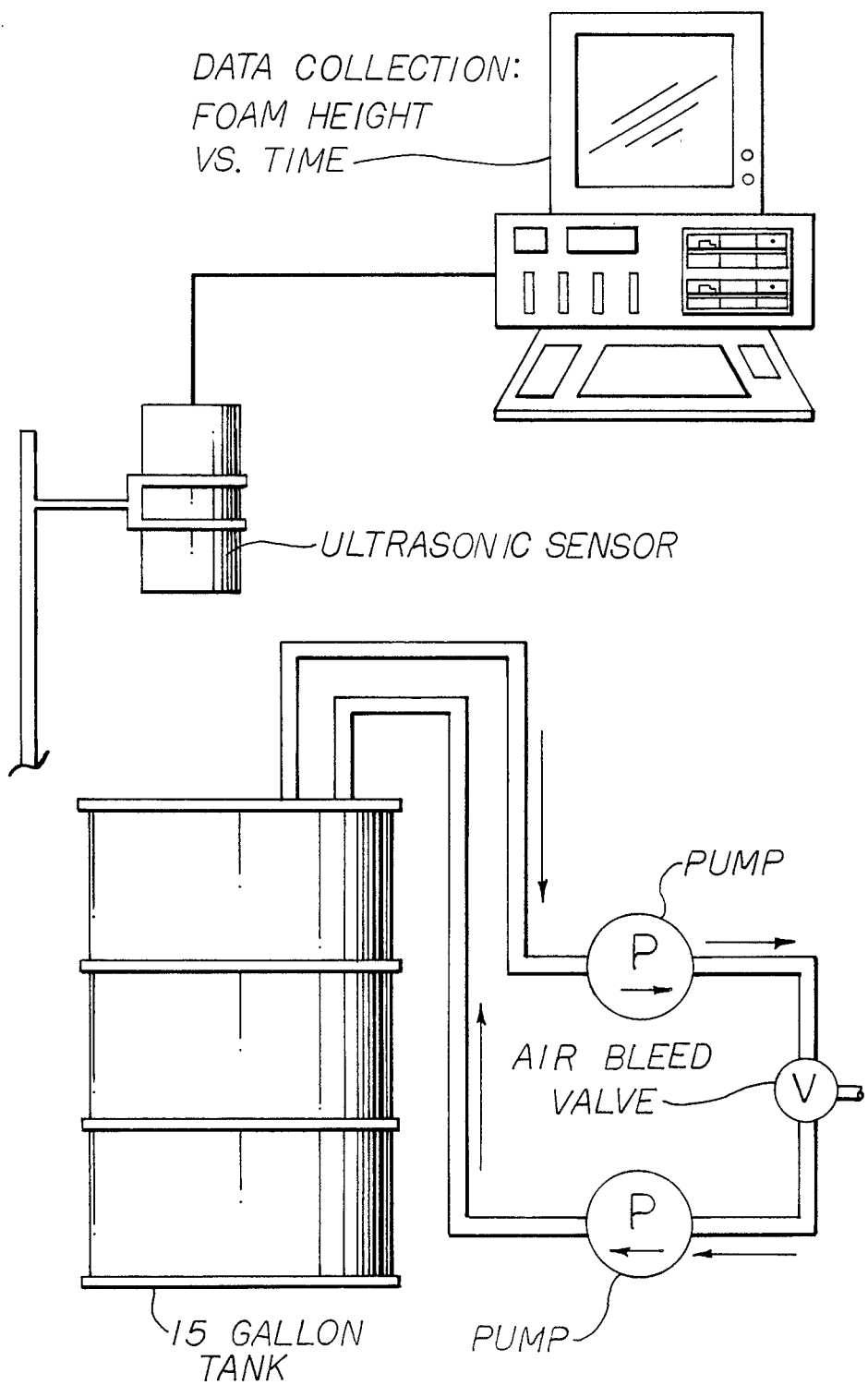

DISPERSIBLE SILICONE WASH AND RINSE CYCLE ANTIFOAM FORMULATIONS

RELATED APPLICATIONS

This application is a continuation-in-part of my prior copending U.S. application Ser. No. 07/228,079, filed on Aug. 4, 1988, now U.S. Pat. No. pending and entitled "Dispersible Silicone Antifoam Formulations".

BACKGROUND OF THE INVENTION

This invention relates to a dispersible antifoam formulation containing a silicone for incorporation into laundry detergents and which antifoam formulation provides a controlled wash cycle and especially rinse cycle foaming behavior.

Solid detergent formulations are sold in powder or granular form. A disadvantage of solid detergents is that, on account of the hydroscopicity of individual raw materials of the formulation, the solid detergent shows a pronounced tendency towards caking or clumping in the presence of small quantities of moisture. This does not make the detergent unusable, however, because the effect of the individual components of the detergent remain intact even after clumping or caking in the presence of moisture. However, the appearance of the detergent in most cases is diminished. As a result, there has been a desire to develop liquid detergent compositions for use in lieu of conventionally formulated solid detergent compositions. The liquid detergent allows for use of lower washing temperatures inclusive of cold water laundering. Granular detergents have not fully adapted to such variations because of weaknesses in respect of dissolving speed, insolubility, and cleaning efficiency. Due to such problems of caking and the slowness of solid and granular detergents to dissolve, trends in detergent manufacture have leaned toward the liquid detergent. Such detergents usually include an organic surfactant, water, various detergent builder systems, enzymes, bleaches, pH modifiers, and solvents. It is not uncommon to also include an antifoam or defoamer formulation as a part of the detergent package.

A defoamer or antifoam agent is a material which, when added in low concentration to a foaming liquid, controls the foam problem. The defoamer equilibrates the rate of foam collapse with the rate of foam formation Such materials, in addition, remove unsightly and troublesome surface foam, improve filtration, watering, washing, and drainage, of various types of suspensions, mixtures, and slurries. Defoamers have found application traditionally in such areas of use as the pulp and paper industry, paints and latex, coating processes, fertilizers, textiles, fermentation processes, metal working, adhesive, caulk and polymer manufacture, the sugar beet industry, oil well cement, cleaning compounds, cooling towers, and in chemical processes of varied description such as municipal and industrial primary and secondary waste water treatment facilities.

It is essential for a defoamer that it be inert and not capable of reacting with the product or system in which it is used, and that it have no adverse effect on the product or system. The components of a defoamer generally consist of primary and secondary antifoam agents, a carrier, an emulsifier, and optionally a stabilizing agent. The primary antifoam agent is the main ingredient of the defoamer and includes materials such as hydrophobic silicone treated silica, fatty amides, hydrocarbon waxes, and fatty acids and esters. In particular, hydrophobic silica is finely divided silica coated with chemisorbed silicone. The silica is dispersed in hydrocarbon oil and the hydrophobic silica particles present a low energy silicone surface to the foamed environment. In the absence of the hydrocarbon oil, hydrophobic silica itself has no defoaming capacity. The secondary antifoam agent acts synergistically with the primary antifoam agent and includes such materials as silicones, and fatty alcohols and esters. Carriers frequently comprise hydrocarbon oils, water, fatty alcohols and esters, and solvents. Emulsifiers such as esters, ethoxylated compounds, sorbitan esters, silicones, and alcohol sulfates, function to spread or introduce the primary and secondary antifoam agents and the carrier into the system. Shelf life of defoamers can be improved by stabilizing agents, and often in water-based defoamers, a preservative is added to prevent bacterial spoilage in the drum or shipping container. Such stabilizing agents have consisted of, for example, oleic acid, hexylene glycol, fatty alcohols, naphthalene sulfonates, butyl alcohol, and formaldehyde.

The inclusion of a defoamer or antifoam agent in a liquid laundry detergent is not new, however, it is not common. This is for the reason that it is particularly difficult to homogeneously disperse antifoam formulations into aqueous mediums such as liquid laundry detergents. A liquid laundry detergent is a complex formulation chemically and ingredient-wise, and often the complexity of such formulations hinder a homogeneous dispersion of an antifoam composition in the detergent. The result is often loss of clarity seen in hazy formulations, as well as flocculates of antifoam accumulating at the surface of the detergent. The use of antifoams in granular and powdered detergent formulations is taught in a number of references, exemplary of which are, for example, West German published unexamined application (Offenlegungsschrift) No. 2832679 of Feb. 15, 1979; French published unexamined application No. 2285453 of May 21, 1976; European published unexamined application No. 0091802A1 of Oct. 19, 1983; and in U.S. Pat. Nos. 4,400,288, and 4,732,694, issued Aug. 23, 1983 and Mar. 22, 1988, respectively. Typical of liquid type laundry detergent formulations which include an antifoaming agent or suds suppressor can be found in, for example, U.S. Pat. No. 4,075,118, issued Feb. 21, 1978, and in U.S. Pat. No. 4,798,679, issued Jan. 17, 1989. A particularly effective silicone antifoam agent is taught in U.S. Pat. No. 4,639,489, issued Jan. 27, 1987 and in U.S. Pat. No. 4,749,740, issued June 7, 1988. However, in aqueous medium such as liquid laundry detergents, this antifoam like other antifoam formulations has been found to be difficultly dispersible.

Therefore, and in accordance with the present invention, it has been discovered that certain combinations of surfactants and dispersants when included with and incorporated into an antifoam formulation of U.S. Pat. Nos. 4,639,489 and 4,749,740, render the antifoam dispersible in aqueous mediums such as liquid laundry detergents, and therefore solve the problem of dispersibility of the antifoam formulations.

In U.S. Pat. No. 3,784,479, issued Jan. 8, 1974, to Keil, there is disclosed an emulsion or dispersion of a foam control agent in a polyglycol such as polypropyleneoxide, polyethyleneoxide, or copolymers thereof, for use in aqueous systems. However, the aqueous systems in Keil are industrial systems such as alkaline soap solutions, evaporated alkaline paper black liquors, concentrated synthetic rubber latices, steam distilled styrene-butadiene emulsions, refined sugar, dyed textiles, and sewage. An alkaline soap solution cannot be considered a domestic laundry detergent because laundry detergents are not made from soap. Further, except for the non-aqueous polyglycol vehicle in Keil, the surfactants included therein are all silicone type, as compared to the mixed organic and silicone type surfactants of the present invention. In addition, and in contrast to the present invention, Keil fails to teach the inclusion of a secondary antifoam agent, as well as an nonionic organic surfactant. Thus, a laundry detergent can be provided herein and which contains an improved antifoam formulation which is effective in both wash and rinse cycles.

SUMMARY OF THE INVENTION

This invention relates to a dispersible silicone antifoam composition for providing controlled foaming laundry detergent formulations and wherein there is provided a non-aqueous emulsion of primary and secondary antifoam agents, the primary antifoam agent being a mixture of (a) a polyorganosiloxane fluid, (b) a resinous siloxane or a silicone resin-producing silicon compound, (c) a finely divided filler material, and (d) a catalyst to promote the reaction of (a) to (c), the secondary antifoam agent being a blend of a polydimethylsiloxane substituted with polar groups and a polydimethysiloxane fluid, at least one nonionic silicone surfactant for emulsifying the primary and secondary antifoam agents in a solvent, a first organic surfactant dispersing agent for assisting in dispersing the emulsified primary and secondary antifoam agents in the laundry detergent, and a second dispersing agent of a nonionic difunctional block-copolymer terminating in primary hydroxyl groups for further assisting in dispersing the emulsified primary and secondary antifoam agents in the laundry detergent.

The invention also relates to a dispersible silicone antifoam composition for providing controlled foaming and wherein there is provided a non-aqueous emulsion of primary and secondary antifoam agents, the primary antifoam agent being a mixture of (a) a polyorganosiloxane fluid, (b) a resinous siloxane or a silicone resin-producing silicon compound, (c) a finely divided filler material, and (d) a catalyst to promote the reaction of (a) to (c), the secondary antifoam agent being a blend of a polydimethylsiloxane substituted with polar groups and a polydimethysiloxane fluid, at least one nonionic silicone surfactant for emulsifying the primary and secondary antifoam agents in a solvent, a first organic surfactant dispersing agent for assisting in dispersing the emulsified primary and secondary antifoam agents in an aqueous medium, and a second dispersing agent of a nonionic difunctional block-copolymer terminating in primary hydroxyl groups for further assisting in dispersing the emulsified primary and secondary antifoam agents in an aqueous medium.

In another embodiment of the present invention, the primary antifoam agent may also include a polyorganosiloxane fluid which is substantially free of reactive groups. The nonionic silicone surfactant is a material including trimethylsilyl endcapped polysilicate which has been condensed with a polyalkylene glycol or diester in a solvent. Optionally, another silicone surfactant can be included such as a copolymer of polymethylsiloxane and polyalkylene oxide in a solvent. In a specific embodiment, the polydimethylsiloxane fluid in the blended secondary antifoam agent has a viscosity of about one thousand centistokes, the solvent is polypropylene glycol having an average molecular weight of about two thousand, and the block copolymer is an ethylene oxide propylene oxide block copolymer The most preferred primary antifoam agent is that formulation of U.S. Pat. Nos. 4,639,489, and 4,749,740, which formulation covers a silicone defoamer composition produced by reacting at a temperature of 50° C. to 300° C.:

(1) 0 to 100 parts by weight of a polyorganosiloxane having a viscosity of 20 to 100,000 cs at 25° C. and being expressed by the general formula $R^1_a SiO_{(4-a)/2}$ in which $R^1$ is a monovalent hydrocarbon or halogenated hydrocarbon group having 1 to 10 carbon atoms and a has an average value of from 1.9 to 2.2;

(2) less than five parts by weight of a polyorganosiloxane having a viscosity of 200 to several million cs at 25° C. expressed by the general formula $R^2_b(R^3O)_c SiO_{(4-b-c)/2}$ in which $R^2$ is a monovalent hydrocarbon or halogenated hydrocarbon group having 1 to 10 carbon atoms, $R^3$ is hydrogen or a monovalent hydrocarbon group having 1 to 10 carbon atoms, b has an average value of from 1.9 to 2.2 and c has a sufficiently large value to give at least one $-OR^3$ group in each molecule, said $-OR^3$ group being present at least at the end of at molecular chain; the total of components (1) and (2) being 100 parts by weight;

(3) 0.5 to 20 parts by weight for every 100 parts by weight of said components (1) and (2) of one or more compounds selected from the following (a) to (d):

(a) an organosilicon compound of the general formula $R^4_d SiX_{4-d}$ which $R^4$ is a monovalent hydrocarbon group having 1 to 5 carbon atoms, X is a hydrolyzable group and d has an average value of one or less;

(b) a partially hydrolyzed condensate of said compound (a);

(c) a siloxane resin consisting essentially of $(CH_3)_3 SiO_{\frac{1}{2}}$ and $SiO_2$ units and having a $(CH_3)_3 SiO_{\frac{1}{2}}/SiO_2$ ratio of 0.4/1 to 1.2/1; and (d) a condensate of said compound (c) with said compound (a) or (b);

(4) 0.5 to 30 parts by weight of a finely divided filler for every 100 parts by weight of said components (1) and (2);

(5) a catalytic amount of a compound for promoting the reaction of the other components; and (6) 0 to 20 parts by weight, for every 100 parts by weight of said components (1) and (2), of a polyorganosiloxane having a viscosity of 5 to 200 cs at 25° C. and being expressed by the general formula $R^8_e(R^9O)_f SiO_{(4-e-f)/2}$ in which $R^8$ is a monovalent hydrocarbon or halogenated hydrocarbon group having 1 to 10 carbon atoms, $R^9$ is hydrogen or a monovalent hydrocarbon group having 1 to 10 carbon atoms, e is from 1.9 to 2.2 on an average and f has a sufficiently large value to give at least two $-OR^9$ groups in each molecule at the end of a molecular chain.

In this formulation, the $R^1$ groups of component (1), the $R^2$ groups of component (2) and the group of component (6) are hydrocarbon groups; the X groups of component (3) (a) are $-OR^5$ groups or groups in which $R^6$ is a divalent hydrocarbon group having 1 to 5 carbon atoms and $R^5$ and $R^7$ are each hydrogen or a monovalent hydrocarbon group having 1 to 5 carbon atoms; component (4) is silica; and component (5) is a compound selected from the group consisting of alkali metal hydroxides, alkali metal silanolates, alkali metal alkoxides and metal salts of organic acids. Further, component (1) is a trimethylsiloxy-endblocked polydimethylsiloxane fluid having a viscosity of from 350 to 15,000 centistokes at 25° C.; component (2) is a hydroxyl-endblocked polydimethylsiloxane fluid having a viscosity of from 1,000 to 50,000 centistokes of 25° C.; component (4) is a silica having a surface area of from 50 to 500 $m^2/g$; and component (6) is a hydroxyl-endblocked polydimethylsiloxane having a viscosity of from 10 to 50 centistokes at 25° C. Optionally, a less preferred primary antifoam agent can be prepared in which components (2) and (6) are omitted.

The polar substituted polydimethylsiloxane component of the secondary antifoam agent blended composition is described in detail in U.S. Pat. No. 4,563,347, issued on Jan. 7, 1986, the disclosure of which is considered to be incorporated herein by reference. This polar substituted polydimethylsiloxane component can be best described as a siloxane having the general formula $R_aX_{3-a}Si(OSiX_2)_n(OSiX_bR_{2-b})_mOSiX_{3-a}R_a$ wherein R is a monovalent radical having the general formula $-C_yH_{2y}Z$ wherein y has a value of 2 to 8 and Z is selected from the group consisting of $-NR'CH_2CH_2NR'_2$, $-COOH$, $-SCH_2COOH$, $$-\overset{\text{O}}{\underset{\|}{C}}NR'_2,$$

$-NR'_2$, $-N^+R'_3A^-$, $-N^+R'H_2A^-$, and $-NR'CH_2CH_2N^+R'H_2A^-$, wherein R'; is selected from the group consisting of hydrogen, phenyl, benzyl, and monovalent saturated hydrocarbon radicals composed of 1 to 20 carbon atoms and $A^-$ is a halogen; X is selected from the group consisting of hydrogen, phenyl, hydroxyl, and saturated hydrocarbon radicals composed of 1 to 8 carbon atoms; a has a value of 0 to 3; b has a value of 0 to 1; and n+m has a value of 1 to 2000 with n having a value of 0 to 1999 and m having a value of 1 to 2000.

It is therefore an object of the present invention to provide an easily dispersible silicone antifoam composition for use in a laundry detergent and wherein there is provided controlled foaming behavior in both the wash and rinse cycles.

These and other features, objects, and advantages, of the herein described present invention will become apparent when taken in conjunction with the following detailed description.

DRAWINGS

The single FIGURE of drawing is a functional representation of automated pump testing apparatus used to determine the performance of antifoam compositions under conditions designed to simulate a laundering cycle.

DETAILED DESCRIPTION

In accordance with the present invention, an antifoam formulation is provided wherein an antifoam is rendered dispersible in aqueous mediums, such as a liquid laundry detergent, by means of a plurality of surfactant and dispersing agents which function as emulsifying ingredients. Preferred emulsifying and dispersing ingredients for the purposes of the present invention are the nonionic or anionic surfactant type. In nonionic surfactants, for example, there is no charge on the molecule, and the solubilizing groups are ethylene oxide chains and hydroxyl groups. Such nonionic surfactants are compatible with ionic and amphoteric surfactants, and representative of nonionic surfactants are, for example, polyoxyethylene or ethoxylate surfactants such as alcohol ethoxylates and alkylphenol ethoxylates. Carboxylic acid ester nonionic surfactants include glycerol esters, polyoxyethylene esters, anhydrosorbitol esters, ethoxylated anhydrosorbitol esters, natural fats, oils, and waxes, and ethoxylated and glycol esters of fatty acids. Carboxylic amide nonionic surfactants which may be included are diethanolamine condensates, monoalkanolamine condensates, and polyoxyethylene fatty acid amide. Representative of polyalkylene oxide block copolymer nonionic surfactants are the polyalkylene oxides derived from ethylene, propylene, butylene, styrene, and cyclohexene. Typical of the anionic surfactants that may be employed herein are salts of alkyl sulfates, salts of alkylaryl sulfates, salts of alkyl ether sulfates, salts of alkylaryl ether sulfates, and salts of alkylaryl sulfonates. Exemplary materials included are, for example, alkyl benzene sulfonates, alkyl glyceryl ether sulfonates, alkyl phenol ethylene oxide ether sulfates, esters of alpha-sulfonated fatty acids, 2-acyloxyalkane-1-sulfonic acids, olefin sulfonates, beta-alkyloxyalkane sulfonates, anionic surfactants based on higher fatty acids, and tallow range alkyl sulfates. Both categories of surfactant are well known in the art and are described in more or less detail in U.S. Pat. No. 4,075,118, issued Feb. 21, 1978, for example.

The preferred silicone antifoam formulation which forms the basis of the primary antifoam agent used herein, is the defoamer composition disclosed and described in U.S. Pat. No. 4,639,489, issued Jan. 27, 1987, and U.S. Pat. No. 4,749,740 issued June 7, 1988, and which defoamer composition is a multi-component system. The defoamer composition of U.S. Pat. No. 4,639,489 and 4,749,740, which patents, the disclosures of which are considered incorporated herein by reference, includes as multi-components a mixture of (a) a polyorganosiloxane fluid having at least one hydroxyl and/or hydrocarbonoxy group, (b) a polyorganosiloxane fluid which is substantially free of reactive groups, (c) a resinous siloxane or a silicone resin-producing silicon compound, (d) a finely divided filler material, and (e) a catalyst to promote the reaction of (a) to (d). The specifics and details of each of the various components of this primary antifoam composition are set forth in the aforementioned U.S. Pat. Nos. 4,639,489 and 4,749,740, and reference may be had thereto.

The antifoam composition of the present invention also preferably includes a secondary antifoam agent for use in conjunction with the primary antifoam agent, and the secondary antifoam agent is described hereinafter.

In order to render the primary and secondary antifoam agents dispersible in aqueous medium, such as a liquid laundry detergent, there is included along with the two antifoam agents, at least one nonionic silicone surfactant for emulsifying the primary and secondary antifoam agents in a solvent; an organic surfactant dispersing agent for assisting in dispersing the emulsified primary and secondary antifoam agents in the laundry detergent, and a dispersing agent of a nonionic difunctional block-copolymer terminating in primary hydroxyl groups for further assisting in dispersing the emulsified primary and secondary antifoam agents in the laundry detergent. One nonionic silicone surfactant can be a copolymer of polymethylsiloxane and polyalkylene oxide in a solvent, or a material including trimethylsilyl endcapped polysilicate which has been condensed with a polyalkylene glycol or diester in a solvent.

The term solvent as used herein is intended to include polyalkylene oxides in general, such as polypropylene glycol having an average molecular weight of about one to four thousand, and polybutylene glycol having an average molecular weight of about one to five thousand. The block copolymer preferred is an ethylene oxide-propylene oxide block copolymer. The nonionic organic surfactant employed is TRITON® X-100, a material of the formula $C_8H_{17}C_6H_4(OCH_2CH_2)_9OH$, manufactured by Rohm and Haas, Philadelphia, Pa., and a registered trademark of Rohm and Haas. The block-copolymer employed is PLURONIC® L-101, a product of BASF-Wyandotte Corporation, Parsippany. N.J., and a registered trademark of BASF-Wyandotte. PLURONIC® L-101 is a difunctional block-copolymer terminating in primary hydroxyl groups with a molecular weight that may range from about one to about fifteen thousand, and a polyalkylene oxide derivative of propylene glycol.

The compositions of the present invention can be used in conjunction with many formulations of liquid or powdered detergents. The antifoam formulations of the present invention can be used separately or mixed directly into such laundry detergents to provide a detergent with reduced foaming behavior. Preferably, the primary and the secondary antifoam agents are mixed and emulsified in polypropylene glycol of average molecular weight of about four thousand with the two nonionic silicone surfactants, followed by addition of the organic nonionic surfactant and the block-copolymer; and then the formulation is mixed with the laundry detergent. The various components of the formulation of the present invention, other than the particular antifoam components of U.S. Pat. Nos. 4,639,489 and 4,749,740, function as the delivery mechanism for the antifoam composition of U.S. Pat. Nos. 4,639,489 and 4,749,740, in order to assist dispersion of the antifoam of U.S. Pat. Nos. 4,639,489 and 4,749,740.

The polydimethylsiloxane fluid portion of the blended composition used herein as the secondary antifoam agent is a high molecular weight polymer having a molecular weight in the range from about 200 to about 200,000 and have a viscosity in the range from about 20 to 2,000,000 centistokes, preferably from about 500 to 50,000 centistokes, more preferably about 1,000 centistokes at 25° C. The siloxane polymer is generally end-blocked either with trimethylsilyl or hydroxyl groups but other end-blocking groups are also suitable. The polymer can be prepared by various techniques such as the hydrolysis and subsequent condensation of dimethyldihalosilanes, or by the cracking and subsequent condensation of dimethylcyclosiloxanes.

The polydimethylsiloxane fluid portion of the blended secondary antifoam agent can be present in combination with particulate silica. Such combinations of silicone and silica can be prepared by affixing the silicone to the surface of silica for example by means of the catalytic reaction disclosed in U.S. Pat. No. 3,235,509. Foam regulating agents comprising mixtures of silicone and silica prepared in this manner preferably comprise silicone and silica in a silicone:silica ratio of from 20:1 to 200:1, preferably about 25:1 to about 100:1. The silica can be chemically and/or physically bound to the silicone in an amount which is preferably about 0.5% to 5% by weight, based on the silicone. The particle size of the silica employed in such silica/silicone foam regulating agents is finely divided and should preferably be not more than 100 millimicrons preferably from 10 millimicrons to 20 millimicrons, and the specific surface area of the silica should exceed about 50 m$^2$/g.

Alternatively, silicone and silica can be prepared for use in the secondary antifoam agent by admixing a silicone fluid of the type herein disclosed with a hydrophobic silica having a particle size and surface area in the range disclosed above. Any of several known methods may be used for making a hydrophobic silica which can be employed herein in combination with a silicone as the secondary foam regulating agent. For example, a fumed silica can be reacted with a trialkyl chlorosilane (i.e., "silanated") to affix hydrophobic trialkylsilane groups on the surface of the silica. In a preferred and well known process, fumed silica is contacted with trimethylchlorosilane. A preferred material comprises a hydrophobic silanated (most preferably trimethyl-silanated) silica having a particle size in the range from about 10 millimicrons to 20 millimicrons and a specific surface area above about 50 m$^2$/g intimately admixed with a dimethyl silicone fluid having a molecular weight in the range of from about 500 to about 200,000, at a weight ratio of silicone to silanated silica of from about 20:1 to about 200:1, preferably from about 20:1 to about 100:1.

Yet another type of material suitable herein as the polydimethylsiloxane fluid portion of the blended secondary antifoam comprises polydimethylsiloxane fluid, a silicone resin and silica. The silicone "resins" used in such compositions can be any alkylated silicone resins, but are usually those prepared from methylsilanes. Silicone resins are commonly described as "three-dimensional" polymers arising from the hydrolysis of alkyl trichlorosilanes, whereas the silicone fluids are "two-dimensional" polymers prepared from the hydrolysis of dichlorosilanes. The silica components of such compositions are microporous materials such as fumed silica aerogels and xerogels having particle sizes and surface areas herein-above disclosed.

The mixed polydimethylsiloxane fluid/silicone resin/silica materials useful in the present compositions as the polydimethylsiloxane fluid portion of the blended secondary antifoam agent can be prepared in the manner disclosed in U.S. Pat. No. 3,455,839. Preferred materials of this type comprise:
(a) from about 10 parts to about 100 parts by weight of a polydimethylsiloxane fluid having a viscosity in the range from 20 to 30,000 mm/s at 25° C.:
(b) 5 to 50 parts by weight of a siloxane resin composed of $(CH_3)_3SiO_{\frac{1}{2}}$ units and $SiO_2$ units in which the ratio of the $(CH_3)_3 SiO_{\frac{1}{2}}$ units to the $SiO_2$ units is within the range of from 0.6/1 to 1.2/1: and
(c) 0.5 to 5 parts by weight of a silica aerogel. Such mixtures can also be sorbed onto and into a water-soluble solid.

As noted hereinabove, the secondary antifoam agent is a blended composition including a polydimethylsiloxane fluid as well as a polar substituted siloxane. The polar substituted siloxane portion of the blended secondary antifoam agent is described in U.S. Pat. No. 4,563,347, issued Jan. 7, 1986.

Antifoam compositions prepared in accordance with the present invention were prepared and tested in order to demonstrate their defoaming capabilities and to determine the effectiveness of the antifoam compositions.

Testing of the invention was carried out to determine the performance under conditions designed to simulate consumer use. One apparatus used was an automated pump tester. The pump tester apparatus is shown in the drawing and consists of a large 15 gallon cylindrical plastic vessel for holding a quantity of simulated wash liquor or laundry detergent in water and two pumps which circulate the wash liquor. Plastic hoses are arranged so that the wash liquor is drawn from the vessel by the first pump and passed through a valve where a controlled amount of air is introduced into the liquid. A second pump mixes the air and wash liquor and returns the mixture to the vessel. When the pumps are started, a column of foam collects on the surface of the liquid in the vessel. The height of this foam column is detected by an ultrasonic ranging device which is connected to a computer so that foam height measurements are recorded at regular time intervals. Thus the apparatus is used to generate a series of foam height versus time plots which are used to determine the performance of foam control agents.

The wash liquor is prepared by dispersing a measured amount of a commercial laundry detergent in 8.6 liters of deionized water to which has been added a known amount of calcium chloride solution. The purpose of the calcium chloride is to simulate water hardness, which is known to have an effect on the foaming properties of laundry detergents. The amount of laundry detergent added to the simulated hard water is calculated by taking the detergent manufacturer's recommended amount for a washing machine and reducing it buy a factor to account for the difference in volume between a typical washing machine and the 8.6 liter volume used in the pump tester. For every evaluation, the foaming behavior of a particular laundry detergent was compared to the same detergent to which the foam control composition has been added. Results of these tests are indicated below.

EXAMPLE I

DASH ® liquid laundry detergent manufactured by The Procter & Gamble Company, Cincinnati, Ohio, was selected as the control. This type of detergent typically includes surfactants such as linear aryl sulfonates, alkyl ether sulfates, and alkyl ethoxylates; a foam control agent of coconut fatty acid soap; builder-buffers such as sodium citrate, sodium tripolyphosphate, and organic amines; hydrotropes such as propylene glycol, ethanol, and sodium xylene sulfonate; and other ingredients such as enzymes, enzyme stabilizers, optical brighteners, perfumes, and dyes; and is described in more detail in U.S. Pat. Nos. 4,318,818, 4,507,219, 4,515,705, and 4,597,898. Seventeen and one-half grams of DASH ® laundry detergent was added to the pump tester apparatus shown in the drawing, containing 8.6 liters of deionized water to which had been added calcium chloride to provide a concentration of calcium ions equivalent to sixty parts per million. The temperature of the water in the tank was sixty degrees Fahrenheit. The simulated wash liquor was recirculated through the pumps, air bleed valve, and tank, and the foam height monitored by the ultrasonic sensor and recorded every forty seconds. The recirculation was continued for six hundred seconds, and the average recorded foam height of the DASH ® laundry detergent was found to be 23.3 centimeters at the end of ten minutes.

EXAMPLE II

Example I was repeated except that to the laundry detergent, there was added one-tenth of one percent by weight of the dispersible antifoam composition of the prior copending application which did not contain as a portion of the secondary antifoam agent the polar substituted siloxane. The composition was formulated by first preparing a master batch of two hundred grams of antifoam composition. The antifoam composition included in parts by weight, twenty parts of the primary antifoam agent, being that composition set forth in U.S. Pat. Nos. 4,639,489, and 4,749,740; ten parts of only the polydimethylsiloxane fluid portion of the secondary antifoam agent and of a viscosity of about one thousand centistokes; four and one-half parts of nonionic silicone surfactant of trimethysilyl endcapped polysilicate; one and one-half parts of TRITON ® X-100 being a nonionic organic surfactant; ten parts of PLURONIC ® L-101 being another nonionic organic surfactant; and fifty-four parts of polypropylene glycol of an average molecular weight of about two-thousand. The pump test of Example I was repeated including DASH ® detergent to which had been added one-tenth of one percent by weight of the foregoing antifoam composition. The simulated wash liquor including the DASH ® detergent and the antifoam composition was recirculated through the pumps, air bleed valve, and tank, and the foam height monitored by the ultrasonic sensor and recorded every forty seconds. The recirculation was continued for six hundred seconds, and the average recorded foam height of the DASH ® detergent containing the antifoam composition was found to be 13.5 centimeters at the end of ten minutes, a reduction in foam height of almost ten centimeters as compared to the DASH ® detergent of Example I which did not contain antifoam composition.

EXAMPLE III

Example II was repeated except that instead of TRITON ® X-100, there was substituted one part of TRITON ® X-405 a nonionic organic surfactant and an octylphenoxy polyethoxy ethanol composition, and one-half of one part of TRITON ® W-30 an anionic organic surfactant and the sodium salt of an alkylaryl polyether sulfate. The PLURONIC ® L-101 was also used in an amount of five parts instead of ten parts, and the amount of polypropylene glycol was increased from fifty-four parts to fifty-nine parts. The pump test of Example II was repeated including DASH ® detergent to which had been added one-tenth of one percent by weight of the foregoing antifoam composition. The simulated wash liquor including the DASH ® detergent and the modified antifoam composition was recirculated through the pumps, air bleed valve, and tank, and the foam height monitored by the ultrasonic sensor and recorded every forty seconds. The recirculation was continued for six hundred seconds, and the average recorded foam height of the DASH ® detergent containing the modified antifoam composition was found to be 14.6 centimeters at the end of ten minutes, a reduction in foam height of almost nine centimeters as compared to the DASH ® detergent of Example I which did not contain antifoam composition

EXAMPLE IV

Example I was repeated, except that in addition to the DASH ® detergent, there was included in the wash liquor, one-tenth of one percent by weight of detergent, of antifoam composition comparable to that described in Example No. 1 of the Keil U.S. Pat. No. 3,784,479. The simulated wash liquor was recirculated through the pumps, air bleed valve, and tank, and the foam height monitored by the ultrasonic sensor and recorded every forty seconds. The recirculation was continued for six hundred seconds, and the average recorded foam height of the DASH ® detergent containing the Keil antifoam formulation was found to be about 20.9 centimeters at the end of ten minutes, indicating that the formulation in Keil is not as effective as an antifoam agent in laundry detergents as are the previous formulations.

The basic distinction between the prior copending U.S. application Ser. No. 07/228,079, filed on Aug. 4, 1988, is that in the silicone antifoam formulation of the prior application, the secondary antifoam agent included only a particular polydimethylsiloxane fluid. In accordance with the present invention, that same fluid is employed in the secondary antifoam agent, but in addition there is included as a component of the secondary antifoam agent, a polar substituted siloxane. The addition of the polar substituted constituent renders the antifoam of the present invention more effective in the rinse cycle than antifoam formulations wherein the secondary antifoam agent is polydimethylsiloxane only. Both the antifoam of the present invention and the antifoam formulation of prior copending U.S. application Ser. No. 228,027 are carried into the rinse water via residual wash water and antifoam which adheres to the fabric. However, the antifoam of the present invention is significantly more effective in reducing the amount of foam produced in the rinse cycle.

A particularly preferred polydimethylsiloxane substituted with polar groups is a compound of the formula

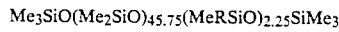

$$Me_3SiO(Me_2SiO)_{45.75}(MeRSiO)_{2.25}SiMe_3$$

where Me is methyl and R is

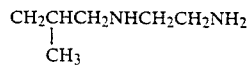

$$\begin{array}{c} CH_2CHCH_2NHCH_2CH_2NH_2 \\ | \\ CH_3 \end{array}$$

Such polar substituted siloxanes, as noted hereinbefore, are set forth in U.S. Pat. No. 4,563,347, and have been generally described above.

The antifoam compositions of the present invention including the polar substituted siloxane were tested in accordance with Example II and found to be comparably effective in reducing foam in what can be considered equivalent to the wash cycle in such simulated tests. However, in order to show the effectiveness of the antifoam compositions of the present invention in the rinse cycle as well as the wash cycle, the following examples are illustrated.

EXAMPLE V

Evaluation of Silicone Antifoams for Rinse Cycle Foam Control in Liquid Detergents The evaluations were performed using a small-capacity home washing machine equipped with a separate chamber for spinning clothing to remove water. For each test, 1.1 kg. of clean fabric consisting of a 65/35 mixture of cotton and cotton/polyester blend was used to simulate a wash load. The water used in this testing for washing and rinsing was drawn from a large reservoir of 70° F. water with a total hardness of approximately 50 ppm and neutral pH. For the wash cycle, 30 liters of water was used together with the indicated amount of detergent and foam control agent. Following the wash cycle, the fabric was transferred to the spinning tub and spun to remove the wash liquor. The amount of residual wash liquor on the fabric after spinning was controlled to a reproducible value by making certain that the fabric was consistently loaded into the spinning chamber, and rejecting any fabric load that was outside the range of about 0.61 kg. to 0.64 kg of residual wash liquor.

After spinning, the fabric was returned to the first tub and rinsed using an overflow rinse. This was performed by filling the tub with approximately 39 liters of water and then continuing to pass water over the fabric at 9 liters/minute for 5 minutes. The agitator in the wash-/rinse tub was run continuously during the overflow rinse. After the 5 minute rinse, the water flow was stopped and samples of the rinse water were removed from the tub to determine foaming behavior. The automated pump tester described previously was employed, with some modifications, to determine the foaming behavior of the rinse water samples. For the rinse water samples, the ultrasonic ranging device was not used. A graduated cylinder was used in its place to visually gauge the height of the foam at an given time. The foam height was reported in units where 1 unit equals 1 large division on the side of the cylinder. Also, the amount of samples used for the rinse water determinations was 3.8 liters instead of the 8.6 liters used in the previously described simulated wash water testing. The most reproducible test result found for the rinse water testing was the maximum foam height observed in the pump tester. This response was also found to correlate best with visual observations of the amount of foam present in the rinse cycle.

Four separate formulations were tested to determine the foaming behavior of the rinse water in accordance with Example V. Formulation "A" is a liquid detergent which contains no fatty acid foam control agent. Formulation "B" is the same as "A", except that it contains a fatty acid foam control agent. Formulation "C" is the same as "A" except it contains as the antifoam agent, the antifoam formulation of the prior copending U.S. application Ser. No. 228,079 which contains only polydimethylsiloxane fluid as the secondary antifoam agent.

Formulation "D" is the same as Formulation "A" except that it contains an antifoam formulation of the present invention including as the secondary antifoam agent the blend of polydimethylsiloxane fluid and polar substituted siloxane. For each evaluation, 50 grams of the detergent was used and each formulation was tested at least two times and the results averaged. The amount of foam control agent in each detergent sample is shown in Table I together with the average maximum foam height measured from the rinse water.

TABLE I

| | Amount of Foam Control Agent/50 gm. | Maximum Foam Height |
|---|---|---|
| Formulation A | 0.00 | 4.67 |
| Formulation B | 1.20 | 1.71 |
| Formulation C | 0.15 | 2.16 |
| Formulation D | 0.15 | 1.46 |

EXAMPLE VI

Evaluation of Silicone Antifoams for Rinse Cycle Foam Control in Powdered Detergents In order to determine the utility of the antifoam formulation of the present invention in powdered detergents, another set of tests were run according to the procedure in Example V. For this example, a powdered detergent similar to a commercial product was prepared, but the fatty acid foam control agent was omitted from the formulation. This formulation is designated Formulation "A" in Table II. Formulation "B" is a commercial powdered detergent similar to "A" except it contains 4% fatty acid foam control agent. To evaluate the silicone antifoam formulations, the silicone was weighed out with the powdered detergent, and both were loaded into the washing machine at the same time. In each evaluation, 25 grams of powdered detergent was used, and each detergent and antifoam combination was tested at least three times and the average results reported. Silicone antifoam "1" is the antifoam formulation of the prior copending U.S. application Ser. No. 228,079 which contains only polydimethylsiloxane fluid as the secondary antifoam agent. Silicone antifoam "2" is the antifoam formulation of the present invention including as the secondary antifoam agent the blend of polydimethylsiloxane fluid and polar substituted siloxane. The results are shown in Table II.

TABLE II

| | Maximum Foam Height |
|---|---|
| Formulation A | 2.76 |
| Formulation B | 1.72 |
| Formulation A + 0.15 grams silicone antifoam 1 | 1.48 |
| Formulation A + 0.15 grams silicone antifoam 2 | 1.20 |

In Examples V-VI, the weight ratio of the blend of the siloxane fluid and the polar substituted siloxane is about 1:9.

Whereas the particulate material of the secondary antifoam agent of the present invention has been illustrated by means of silica, it should be understood that other equivalent particulate materials may be used in accordance with the present invention. Thus, for example, there can be used in place of or in addition to silica, high surface area particulates such as crushed quartz, zirconium silicate, aluminum silicate, mica, ground glass, and sand. The term "silica" as used herein is intended to include, for example, silica such as fume silica, precipitated silica, and treated silica such as fume silica and precipitated silica that has been reacted with an organohalosilane, a disiloxane, or disilizane.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. In a laundry detergent including a surfactant, builder, and at least one foam control agent, the improvement comprising a dispersible silicone antifoam composition for providing controlled foaming comprised of a non-aqueous emulsion of primary and secondary antifoam agents; the primary antifoam agent being a mixture of (a) a polyorganosiloxane, (b) a resinous siloxane or a silicone resin-producing silicon compound, (c) a finely divided filler material, and (d) a catalyst to promote the reaction of mixture components (a), (b), and (c), to form silanolates; the secondary antifoam agent being a blend of a polydimethylsiloxane substituted with polar groups and a polydimethylsiloxane fluid; the substituted polydimethylsiloxane providing more effective reduction of foaming in the laundry rinse cycle; at least one nonionic silicon surfactant, a first organic surfactant dispersing agent, and a second dispersing agent of a nonionic difunctional block-copolymer terminating in primary hydroxyl groups.

2. The composition of claim 1 wherein the nonionic silicone surfactant is a copolymer of polymethylsiloxane and polyalkylene oxide in a polyalkylene oxide solvent.

3. The composition of claim 2 including a second nonionic silicone surfactant which is a trimethylsilyl endcapped polysilicate which has been condensed with a polyalkylene glycol or diester in a solvent.

4. The composition of claim 3 wherein the polydimethylsiloxane fluid of the blended secondary antifoam agent has a viscosity of about one thousand centistokes.

5. The composition of claim 4 wherein the solvent is polypropylene glycol having an average molecular weight of about one to four thousand.

6. The composition of claim 5 wherein the block copolymer is an ethylene oxide-propylene oxide block copolymer.

7. The composition of claim 1 wherein the polydimethylsiloxane substituted with polar groups is a siloxane having the formula $R_aX_{3-a}Si(OSiX_2)_n(OSiX_bR_{2-b})_mOSiX_{3-a}R_a$ wherein R is a monovalent radical having the general formula $-C_yH_{2y}Z$ wherein y has a value of 2 to 8 and Z is selected from the group consisting of $-NR'CH_2CH_2NR'_2$, $-COOH$, $-SCH_2COOH$,

$-NR'_2$, $-N^+R'_3A^-$, $-N^+R'H_2A^-$, and $-NR'CH_2CH_2N^+R'H_2A^-$, wherein R'; is selected from the group consisting of hydrogen, phenyl, henzyl, and monovalent saturated hydrocarbon radicals composed of 1 to 20 carbon atoms and $A^-$ is a halogen; X is selected from the group consisting of hydrogen, phenyl, hydroxyl, and saturated hydrocarbon radicals composed of 1 to 8 carbon atoms; a has a value of 0 to 3; b has a value of 0 to 1; and n m has a value of 1 to 2000 with n having a value of 0 to 1999 and n+m having a value of 1 to 2000.

8. A dispersible silicone antifoam composition for providing controlled foaming comprising a non-aqueous emulsion of primary and secondary antifoam agents; the primary antifoam agent being a mixture of (a) a polyorganosiloxane, (b) a resinous siloxane or a silicon resin-producing silicon compound, (c) a finely divided filler material, and (d) a catalyst to promote the reaction of mixture components (a), (b) and (c), to form silanolates; the secondary antifoam agent being a blend of a polydimethylsiloxane substituted with polar groups and a polydimethylsiloxane fluid; the substituted polydimethylsiloxane providing more effective reduction of foaming in the laundry rinse cycle; at least one nonionic silicone surfactant, a first organic surfactant dispersing agent, and a second dispersing agent of a nonionic difunctional block-copolymer terminating in primary hydroxyl groups.

9. The composition of claim 8 wherein the nonionic silicone surfactant is a copolymer of polymethylsiloxane and polyalkylene oxide in a polyalkylene oxide solvent.

10. The composition of claim 9 including a second nonionic silicone surfactant which is a trimethylsilyl endcapped polysilicate which has been condensed with a polyalkylene glycol or diester in a solvent.

11. The composition of claim 10 wherein the polydimethylsiloxane fluid of the blended secondary antifoam agent has a viscosity of about one thousand centistokes.

12. The composition of claim 11 wherein the solvent is polypropylene glycol having an average molecular weight of about one to four thousand.

13. The composition of claim 12 wherein the block copolymer is an ethylene oxide-propylene oxide block copolymer.

14. The composition of claim 8 wherein the polydimethylsiloxane substituted with polar groups is a siloxane having the formula $R_aX_{3-a}Si(OSiX_2)_n(OSiX_bR_{2-b})_mOSiX_{3-a}R_a$ wherein R is a monovalent radical having the general formula $-C_yH_{2y}Z$ wherein y has a value of 2 to 8 and Z is selected from the group consisting of $-NR'CH_2CH_2NR'_2$, $-COOH$, $-SCH_2COOH$,

$-NR'_2$, $-N^+R'_3A^-$, $-N^+R'H_2A^-$, and $-NR'CH_2CH_2N^+R'H_2A^-$, wherein R'; is selected from the group consisting of hydrogen, phenyl, benzyl, and monovalent saturated hydrocarbon radicals composed of 1 to 20 carbon atoms and $A^-$ is a halogen; X is selected from the group consisting of hydrogen, phenyl, hydroxyl, and saturated hydrocarbon radicals composed of 1 to 8 carbon atoms; a has a value of 0 to 3; b has a value of 0 to 1; and n m has a value of 1 to 2000 with n having a value of 0 to 1999 and m having a value of 1 to 2000.

* * * * *